United States Patent
Schmitt et al.

(10) Patent No.: US 10,969,489 B2
(45) Date of Patent: Apr. 6, 2021

(54) METHOD FOR DETECTING AND AUTONOMOUSLY TRACKING A TARGET OBJECT USING A LIDAR SENSOR

(71) Applicant: Jena-Optronik GmbH, Jena (DE)

(72) Inventors: Christoph Schmitt, Jena (DE); Florian Kolb, Jena (DE)

(73) Assignee: Jena-Optronik GmbH, Jena (DE)

( * ) Notice: Subject to any disclaimer, the term of this patent is extended or adjusted under 35 U.S.C. 154(b) by 358 days.

(21) Appl. No.: 15/987,217

(22) Filed: May 23, 2018

(65) Prior Publication Data

US 2018/0341021 A1 Nov. 29, 2018

(30) Foreign Application Priority Data

May 24, 2017 (DE) .................... 10 2017 111 351.7

(51) Int. Cl.
G01C 3/08 (2006.01)
G01S 17/66 (2006.01)
G01S 17/89 (2020.01)
G06K 9/00 (2006.01)
G01S 17/42 (2006.01)

(52) U.S. Cl.
CPC .............. *G01S 17/66* (2013.01); *G01S 17/42* (2013.01); *G01S 17/89* (2013.01); *G06K 9/00214* (2013.01)

(58) Field of Classification Search
CPC ............ G01S 17/66; G01S 17/89; G01S 7/42; G06K 9/00214
USPC ........................................................ 356/5.01
See application file for complete search history.

(56) References Cited

U.S. PATENT DOCUMENTS 9,715,761 B2\* 7/2017 Lee ..................... G06K 9/00201
2014/0118716 A1 5/2014 Kaganovich
2015/0288947 A1\* 10/2015 Ahrns ................ G06K 9/00201
348/46

FOREIGN PATENT DOCUMENTS

DE 102014005181 A1 10/2015

OTHER PUBLICATIONS

German Patent Office; Office Action in German Patent Application No. 10 2017 111 351.7 dated Jan. 26, 2018; 6 pages.
(Continued)

*Primary Examiner* — Mark Hellner
(74) *Attorney, Agent, or Firm* — Dorton & Willis, LLP

(57) ABSTRACT

A method for detecting and autonomously tracking a target object using a LIDAR sensor that continuously emits laser pulses onto the target object and generates a 3-D point cloud from measurement points reflected by the target objects at predetermined time intervals. A current relative position of the target object is calculated for six degrees of freedom of movement of the target object at the predetermined time intervals based on algorithms estimating the position. The method includes acquiring a high-resolution initializing point cloud over a plurality of predetermined time intervals, generating a reference model with a small number of measurement points from the initializing point cloud, and, in subsequent iterative steps, determining temporal position clouds and comparing the position clouds with the reference model using the algorithms. Position information of the target object is calculated, wherein the reference model is continuously adapted to the changes in the point clouds.

7 Claims, 1 Drawing Sheet

(56) References Cited

OTHER PUBLICATIONS

Ruel, S.; Target Localization from 3D data for On-Orbit Autonomous Rendezvous & Docking; Aerospace Conference, 2008 IEEE; pp. 1-11.

* cited by examiner

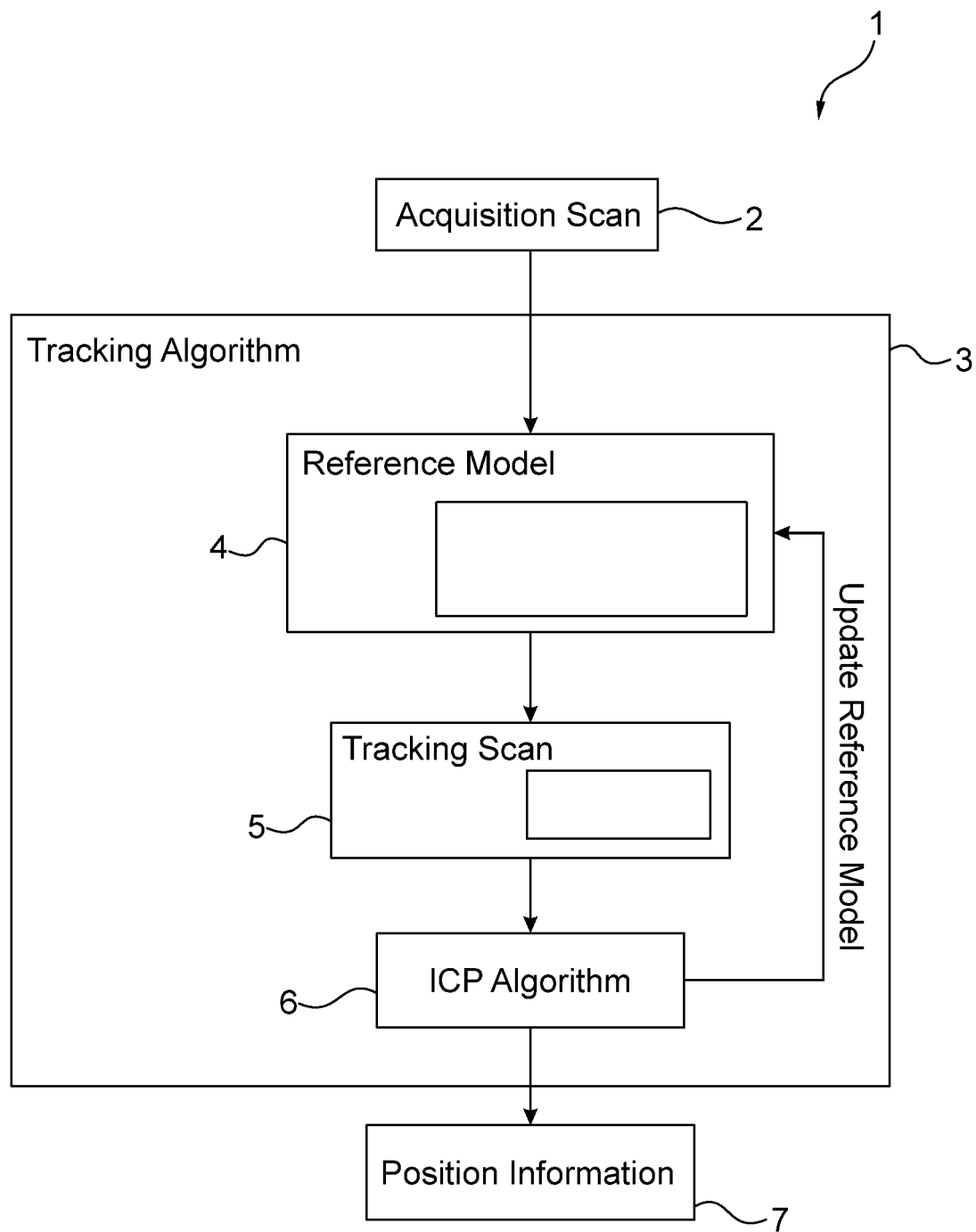

METHOD FOR DETECTING AND AUTONOMOUSLY TRACKING A TARGET OBJECT USING A LIDAR SENSOR

CROSS-REFERENCE TO RELATED APPLICATIONS

This application claims the benefit of priority under 35 U.S.C. § 119(a) to German Patent Application DE 10 2017 111 351.7, filed May 24, 2017 (pending), the disclosure of which is hereby incorporated by reference in its entirety.

TECHNICAL FIELD

The invention relates to a method for detecting and autonomously tracking a target object, in particular a non-cooperative spacecraft, by means of a LIDAR sensor, wherein the LIDAR sensor continuously emits laser pulses onto the target object across a predetermined surface area and generates a 3D point cloud from measurement points reflected by the target objects at predetermined time intervals, and a current relative position of the target object relative to the LIDAR sensor is calculated for six degrees of freedom of movement of the target object at the predetermined time intervals on the basis of algorithms estimating the position.

BACKGROUND

For relative navigation between spacecraft by means of a 3D LIDAR system, for example a LIDAR sensor, the detection and autonomous tracking of a target object ("target") is essential. The LIDAR sensor must be able to identify a target object, for example from a distance of several kilometers, and track its position. For scenarios with non-cooperative targets, such as servicing or deorbit missions, for example, distinctive identification elements, such as retroreflectors, are not available. The LIDAR sensor therefore generates point clouds, which have to be analyzed with respect to the relative position with the aid of a suitable method. Simple averaging has been shown to potentially be very inaccurate. Due to the presence of a wide range of materials in space flight with widely varying reflectivities and emission characteristics, sweeping over a target object, for example a geostationary satellite, with laser light within the framework of a servicing mission and analyzing the reflected radiation ("scan") can result in an extremely unevenly distributed point cloud. Averaging can thus lead to severe fluctuations. In theory, the magnitude of the error can reach the dimension of the target object and can, at close range, reach a point at which it is no longer tolerated by the superordinate so-called GNC system (system for the guidance, navigation and control of a spacecraft comprising the LIDAR sensor, Guidance, Navigation & Control, GNC). In the case of a scan across a geostationary satellite with a wingspan of 50 m, for example, the worst case could thus be an error of up to 25 m.

Already starting in the mid-1980s, the mathematical basis for modern pose estimation algorithms was created. These algorithms are able to determine the relative position and location of a target object from 3D point clouds. Due to the noise characteristics of a 3D LIDAR system, however, they can be used only for small distances, for example less than 50 m.

The use of LIDAR sensors for high-resolution generation of 3D point clouds is a standard method for terrestrial applications, for example for mapping, geography, archaeology, surveying. In the space sector, LIDAR sensors are used for position and distance measurement, for example for position control for approach and docking operations of supply spacecraft to the international space station. Already known, far-range LIDAR tracking algorithms are based on the detection of distinctive identification elements, such as retroreflectors, for example. These elements can be uniquely identified on the basis of their high back-reflected amplitudes. If the constellation of reflectors on the target is known, relative position information can be derived even from a distance of several kilometers. This principle cannot be used for scenarios involving non-cooperative target objects, i.e. target objects without appropriate identification elements.

For docking processes from close proximity, the position of the target object can be determined using so-called Iterative Closest Point Algorithms which adapt a mathematical reference model to the 3D point cloud, acquired by the LIDAR sensor in the course of continuously performed scans, by means of an iterative adaptation method. The mentioned algorithms are known, for example, from "Closed-Form Solution of Absolute Orientation Using Unit Quaternions", Berthold K. P. Horn in Vol. 4, No. 4/April 1987/J. Opt. Soc. Am., pages 629-642. This reference discloses algorithms, with which analytical solutions for the translation and rotation between two point clouds are determined on the basis of a simple eigenvalue calculation or singular value decomposition. To do this, however, a correspondence between the scanned points and the reference model has to first be established. The reference model is derived from a CAD model of the target object and, depending on the adaptation method, is parameterized in the form of simple points or as surface elements. Depending on the calculation specification, the corresponding points are determined via a minimization of the point-to-point distance, for example, or via a normal projection onto the reference surfaces. This is followed by the calculation of the translation and rotation. This process is iterated until a, for example square, quality function value falls below a threshold value. With each subsequent iteration, the algorithm converges more and more toward the correct solution, because the adaptation is continuously being improved. The application of this method is limited by the noise behavior of the LIDAR sensor, however, and it can be used reliably only up to a distance of approximately 50 m from the target object.

SUMMARY

The object of the invention is to propose a method that expands the possible uses of a LIDAR sensor, in particular for identifying and autonomously tracking target objects in space, to greater distances.

While the invention will be described in connection with certain embodiments, it will be understood that the invention is not limited to these embodiments. On the contrary, the invention includes all alternatives, modifications and equivalents as may be included within the spirit and scope of the present invention.

The proposed method serves the detection and autonomous tracking of a target object, in particular a non-cooperative spacecraft, by means of a LIDAR sensor. The LIDAR sensor continuously emits laser pulses onto the target object across a predetermined surface area. A 3D point cloud is generated from measurement points reflected by the target objects at predetermined time intervals, and a current relative position of the target object relative to the LIDAR sensor is calculated for six degrees of freedom of movement of the target object at the predetermined time intervals on the basis of algorithms estimating the position. In order to compensate for the noise behavior of the LIDAR sensor over greater distances, a high-resolution initializing point cloud acquired over a plurality of predetermined time intervals is acquired in a first step. In a second step, a noisy reference model with a small number of measurement points is generated from the initializing point cloud, and, in subsequent iterative steps and at the given time intervals, temporal position clouds are determined and compared with the reference model using the algorithms and position information of the target object is calculated, wherein the reference model is continuously adapted to the changes in the point clouds.

According to an advantageous embodiment of the method, the LIDAR sensor is used at distances to the target object that are greater than 50 m.

In the proposed method, the predetermined time intervals are preferably 0.5 seconds to 1 second.

According to an advantageous embodiment of the method, a 3D model of the target object is determined from the point clouds acquired from different viewpoints or from the reference models. According to an advantageous embodiment of the method, the 3D model of the target object can be determined by means of an elliptical approach of a spacecraft with the LIDAR sensor to the target object.

In other words, the proposed method uses a so-called tracking method based on knowledge of the pose estimation algorithms for the identification of a target object referencing six degrees of freedom. Instead of using a CAD model that is true to the original, which may not be available due to a lack of knowledge about a non-cooperative target object or, due to a high level of sensor noise at greater distances, for example more than 50 m, can lead to severe fluctuations in the calculated position, which can in turn negatively affect the result of the position determination, a noisy reference model is used, which is moreover produced by the LIDAR sensor itself during the approach and continuously improved. During the approach, therefore, the LIDAR sensor "learns" the contour of its target object and adapts rapid 1-2 Hz tracking scans, for example, to a continuously improving reference model.

The algorithm is first initialized by means of a slow and high-resolution acquisition scan of the LIDAR sensor. Thus, to begin with, a first reference model of the target object is constructed. In this case, with respect to the computing speed of the computer integrated into or connected with the LIDAR sensor, it is recommended that the reference model be restricted to a predetermined fixed number of points. In the following step, rapid tracking scans are performed. These are now clearly thinned out due to the scanning speed, and can in theory be distributed very unevenly due to the different materials on the target object. The hereby generated point clouds are now adapted by means of an ICP algorithm based on a point-to-point correspondence method and a relative position and location are determined. Since the reference model is likewise "noisy", the first simulation results show a significantly improved and fluctuation-free position estimation. This in turn results in a significantly improved position estimation compared to a simple averaging across the scanned point cloud.

The reference model is now updated on the basis of the scanned new point cloud. To ensure a uniform spatial distribution of the points, with a view to the computing speed, the previously calculated point-to-point correspondence can be used directly or a suitable allocation method can be defined. This method provides a number of advantages. On the one hand, due to the increasing accuracy of the LIDAR sensor during the approach, the reference model is continuously improved throughout the entire approach. The reference model is thus intelligently adapted to the noise behavior of the LIDAR sensor. On the other hand, the LIDAR sensor generates an almost 360° model of the target object during the approach, and thereby continually improves its performance. This is because, during the approach of a spacecraft (chaser) comprising the LIDAR sensor, which acquires and tracks the target object, to its target object, the acting Newtonian mechanics during the movement of a body around a high-mass central body result in elliptical approach trajectories, in which, depending on the mission design, the target object is orbited almost 360° (Hohmann transfer ellipses). It is therefore possible, for example, that a target object, for example a satellite, is at first seen only from the side. During the position determination, the reference model produced by means of the acquisition scan thus initially generates an error with respect to the dimension of the target. With the elliptical approach, however, the LIDAR sensor automatically generates an almost 360° model of the target object and thereby continuously improves its accuracy in the position determination. For position determination from rapid 1-2 Hz tracking scans and assuming extremely noisy measurement values with 1.5 m (3 sigma) noise, even at 1.5 km distance to the target object, first simulations are showing an accuracy in the <1 m (3 sigma) range.

The proposed method can be used as an alternative to the acquisition and autonomous tracking of spacecraft by means of a LIDAR sensor in terrestrial applications. For example, with the proposed procedure, the method can be used as an automatic distance control between two spaced vehicles. The LIDAR sensor can be expanded by a filter, or the filter tailored to the spacecraft can be replaced with a filter that adapts the geometry of a preceding vehicle, for example a passenger car, truck or motorcycle, to the acquired point cloud in the first acquisition scan. Subsequent tracking scans can in turn be adapted to the reference model according to the presented principle, and used to continuously improve said reference model. In addition, the method also shows potential for applications that are more military in nature, such as the acquisition and autonomous tracking and/or approach of a distant aircraft, for example for in-fight refueling of an aircraft, and/or for identifying and tracking target objects, for example in air defense systems.

BRIEF DESCRIPTION OF THE DRAWINGS

The accompanying drawing, which is incorporated in and constitutes a part of this specification, illustrates an exemplary embodiment of the invention and, together with a general description of the invention given above, and the detailed description given below, serves to explain the principles of the invention.

FIG. 1 is a block diagram illustrating an exemplary method in accordance with the principles of the present disclosure.

DETAILED DESCRIPTION

FIG. 1 shows the block diagram 1 of the proposed method for detecting and adapting point clouds of a target object acquired by means of a LIDAR sensor. In a first step, in Block 2, the so-called acquisition scan is performed, in which a point cloud of the highest possible quality is generated. The acquisition scan can be obtained from a plurality of tracking scans, for example, that follow one another in a predetermined time pattern of 1-2 Hz and are overlaid. The acquired data, for example the point cloud of the acquisition scan, serves as an initializing data set at the beginning of a target acquisition of a target object and is moved to Block 3, the so-called tracking algorithm. Within Block 3, in Block 4, the reference model is determined for the first time from the data of Block 2. Because of the great distance to the target object, the quality of the reference model is noisy. Because of the limited computing capacity, the reference model is also limited in terms of its number of measured values. In Block 5, the reference model is applied to a currently acquired point cloud (tracking scan). In Block 6, the tracking scan adapted to the reference model is subjected to the ICP algorithm to determine the position information of the target object. The determined position information is continuously updated in Block 7 and made available to a GNC system. Block 6 iteratively provides the current position information to Block 3, in order to refine the reference model.

While the present invention has been illustrated by a description of an exemplary embodiment, and while this embodiment has been described in detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMBERS

1 Block diagram
2 Block
3 Block
4 Block
5 Block
6 Block
7 Block

What is claimed is:

1. A method for detecting and autonomously tracking an unknown target object with a LIDAR sensor, the method comprising:
   continuously emitting laser pulses from the LIDAR sensor onto the unknown target object across a predetermined surface area;
   generating a 3-D point cloud from measurement points reflected by the target objects at predetermined time intervals;
   calculating a current relative position of the target object relative to the LIDAR sensor for six degrees of freedom of movement of the target object at the predetermined time intervals using algorithms for estimating the position;
   in a first step, acquiring a high-resolution initializing point cloud acquired over a plurality of predetermined time intervals;
   in a second step, generating from the initializing point cloud a noisy reference model having a small number of measurement points; and
   in subsequent iterative steps at the predetermined time intervals:
      determining temporal position clouds,
      comparing the temporal position clouds with the reference model using the algorithms, and
      calculating position information of the target object; and
   continuously updating the reference model based on changes in the point clouds.

2. The method of claim 1, wherein the target object is a non-cooperative spacecraft.

3. The method of claim 1, wherein a distance between the target object and the LIDAR sensor is greater than 50 m (164 feet).

4. The method of claim 1, wherein the predetermined time intervals are in the range of 0.5 seconds to 1 second.

5. The method of claim 1, further comprising:
   generating a 3-D model of the target object based on the updated reference model.

6. A method for detecting and autonomously tracking a target object with a LIDAR sensor, the method comprising:
   continuously emitting laser pulses from the LIDAR sensor onto the target object across a predetermined surface area;
   generating a 3-D point cloud from measurement points reflected by the target objects at predetermined time intervals;
   calculating a current relative position of the target object relative to the LIDAR sensor for six degrees of freedom of movement of the target object at the predetermined time intervals using algorithms for estimating the position;
   in a first step, acquiring a high-resolution initializing point cloud acquired over a plurality of predetermined time intervals;
   in a second step, generating from the initializing point cloud a noisy reference model having a small number of measurement points;
   in subsequent iterative steps at the predetermined time intervals:
      determining temporal position clouds,
      comparing the temporal position clouds with the reference model using the algorithms, and
      calculating position information of the target object; and
   continuously updating the reference model based on changes in the point clouds; and
   generating a 3-D model of the target object based on the point clouds acquired from different viewpoints or based on the updated reference model;
   wherein the 3-D model is generated during an elliptical approach of a spacecraft carrying the LIDAR sensor to the target object.

7. The method of claim 1, further comprising:
   generating a 3-D model of the target object based on the point clouds acquired from different viewpoints.

* * * * *